United States Patent
Kohlndorfer et al.

[11] Patent Number: 5,934,595
[45] Date of Patent: Aug. 10, 1999

[54] SEAT BELT RETRACTOR WITH COMFORT OR TENSION REDUCING FEATURE

[75] Inventors: Kenneth H. Kohlndorfer, Roseville; Mark F. Gray, Sterling Heights; Markell Seitzman, Orchard Lake, all of Mich.

[73] Assignee: Breed Automotive Technology, Inc., Lakeland, Fla.

[21] Appl. No.: 08/972,997

[22] Filed: Nov. 19, 1997

[51] Int. Cl.⁶ .................................................. B60R 22/44
[52] U.S. Cl. ........................................................ 242/375.3
[58] Field of Search ............................ 242/375.3, 375.1; 280/806, 807; 297/475–478

[56] References Cited

U.S. PATENT DOCUMENTS

| | | |
|---|---|---|
| 140,607 | 7/1873 | Young . |
| 184,216 | 11/1876 | Odell . |
| 196,503 | 10/1877 | Underhill . |
| 200,988 | 3/1878 | Decker . |
| 563,556 | 7/1896 | Bryce . |
| 924,669 | 6/1909 | Johnson . |
| 1,968,536 | 7/1934 | Norling . |
| 2,179,841 | 11/1939 | Cassidy . |
| 3,308,907 | 3/1967 | Bodkin . |
| 3,814,213 | 6/1974 | Balass . |
| 4,084,765 | 4/1978 | Bonnaud ............................. 242/375.3 |
| 4,099,683 | 7/1978 | Stouffer et al. . |
| 4,253,620 | 3/1981 | Takei et al. . |
| 4,290,564 | 9/1981 | Karlsson ............................ 242/375.3 |
| 4,427,163 | 1/1984 | Kondziola . |
| 4,429,840 | 2/1984 | Chawla et al. . |
| 4,458,920 | 7/1984 | Ozaki . |
| 4,726,537 | 2/1988 | Escaravage . |
| 4,762,202 | 8/1988 | Ogawa et al. . |
| 5,409,176 | 4/1995 | Kopetzky ............................ 242/375.3 |
| 5,624,084 | 4/1997 | Kopetzky et al. ................... 242/375.3 |
| 5,628,470 | 5/1997 | Ray et al. ........................... 242/375.3 |
| 5,730,385 | 3/1998 | Kopetzky et al. ................... 242/375.3 |

FOREIGN PATENT DOCUMENTS

| | | |
|---|---|---|
| 2 329 303 | 5/1977 | France . |
| 24 35 993 A1 | 2/1976 | Germany . |
| 75 33 791 | 12/1977 | Germany . |
| 28 24 595 | 12/1978 | Germany . |
| 2 118 022 | 10/1983 | United Kingdom . |

*Primary Examiner*—John M. Jillions
*Attorney, Agent, or Firm*—Markell Seitzman

[57] ABSTRACT

A seat belt retractor adapted to be secured about a seated occupant comprising: a spool (54) having a length of seat belt (36) wound thereon for securement of the occupant, a portion of the seat belt forming a shoulder belt portion, the spool rotationally supported upon a frame (52); a tension reducing mechanism for controlling the amount of spring force transmitted from a rewind spring to the spool and hence the force applied to the shoulder of the occupant via the shoulder belt portion of the seat belt, the mechanism comprising: a cylindrical first spool (80) having an ungrooved, smooth body (81) operatively connected to the spool to rotate with the spool; a second reel (100) positioned remote from the first reel (80) having a tapered peripheral surface having a continuous spiral groove of varying diameter thereon, a rewind spring (160) operatively connected to the second reel for providing a rewind force to rewind the seat belt upon the spool; a flexible link (88) joining the first and second reel and for transmitting the force of the spring to the first reel, the link (88) wound about the second reel within the spiral groove and wound about the first reel (80).

10 Claims, 6 Drawing Sheets

SEAT BELT RETRACTOR WITH COMFORT OR TENSION REDUCING FEATURE

BACKGROUND AND SUMMARY OF THE INVENTION

The present invention generally relates to seat belt retractors and more particularly to a seat belt retraction mechanism capable of reducing the rewind force that acts on the shoulder of an occupant via the shoulder belt portion of the seat belt.

Accordingly the invention comprises: a seat belt retractor adapted to be secured about a seated occupant comprising: a spool having a length of seat belt wound thereon for securement of the occupant, a portion of the seat belt forming a shoulder belt portion, the spool rotationally supported upon a frame; a tension reducing first means for controlling the amount of spring force transmitted from a rewind spring to the spool and hence the force applied to the shoulder of the occupant via the shoulder belt portion of the seat belt, the first means comprising: a cylindrical first spool, aligned to an a rotationally axis of the spool, having an ungrooved, smooth body operatively connected to the spool to rotate with the spool; a second reel positioned remote from the first reel including a tapered peripheral surface having a continuous spiral groove of varying diameter thereon, the second reel having an axis of rotation parallel to that of the first reel; a rewind spring operatively connected to the second reel for providing a rewind force to rewind the seat belt upon the spool; a flexible link joining the first and second reel and for transmitting the force of the spring to the first reel, the link wound about the second reel within the spiral groove and wound about the first reel. The link preferably extends away from the second reel, in a direction generally perpendicular to the axis of rotation of the second reel independent of the position of the link within the groove. This orientation avoids excess wear to the lip of the groove or groove segment and reduces associated acoustic noise.

One advantage of the present invention is that as the flexible link, cable or cord is moved between an upper and a lower reel it will extend from the lower or first reel toward the upper or second reel in a general vertical manner. This is not true of the prior art as shown in U.S. Pat. No. 5,628,470 or in U.S. Pat. No. 5,409,176, in which grooves are located on an upper reel. As the cable in these prior art retractors is repositioned between the upper and lower reels the cable will typically be inclined at an angle to the axis of both reels and grooves. This relationship causes the cable to rub upon the outer edges of the groove causing an audible noise and causing the wearing of the typically plastic reels. This is not the case in the present invention.

It is an object of the present invention to provide a seat belt retractor with an improved tension reduction or comfort mechanism.

Many other objects and purposes of the invention will be clear from the following detailed description of the drawings.

DETAILED DESCRIPTION OF THE DRAWINGS

Figure 1:
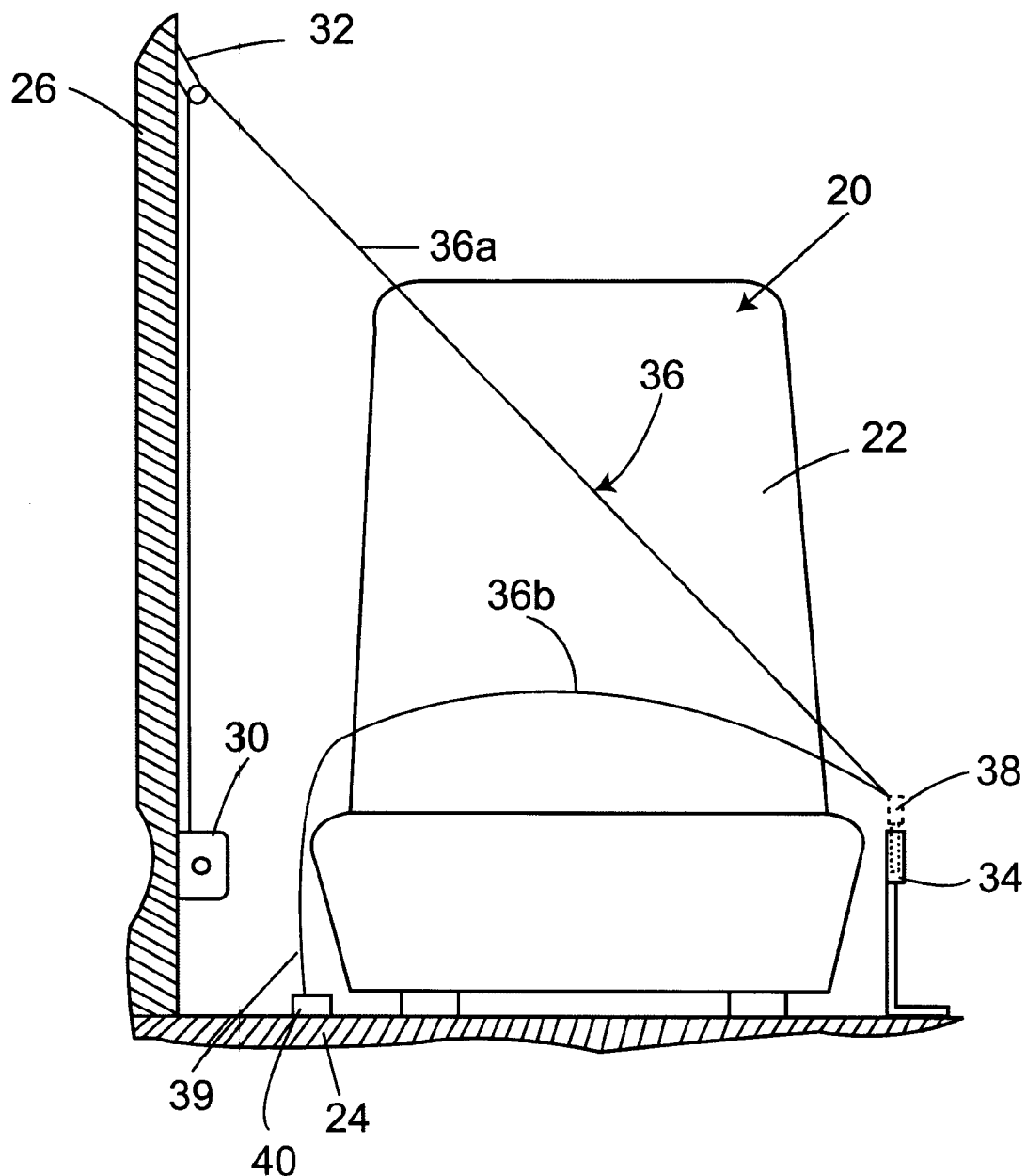
FIG. 1 illustrates an exemplary three-point safety belt system.

Reference is briefly made to FIG. 1 which illustrates an exemplary three-point seat belt system 20. Illustrated in FIG. 1 is a seat 22 located upon a vehicle floor 24. Also illustrated is the B-pillar 26 of the vehicle. The three-point safety belt system 20 comprises a retractor 30, a web guide 32, a seat belt buckle 34 and a length of seat belt webbing 36, having a tongue 36 positioned thereon. The tongue 38 divides the seat belt 36 into a shoulder belt portion 36a and lap belt portion 36b. The lower end 38 of the lap belt portion 36b is appropriately anchored to the vehicle floor. The anchor is shown generally as numeral 40.

Figure 2:
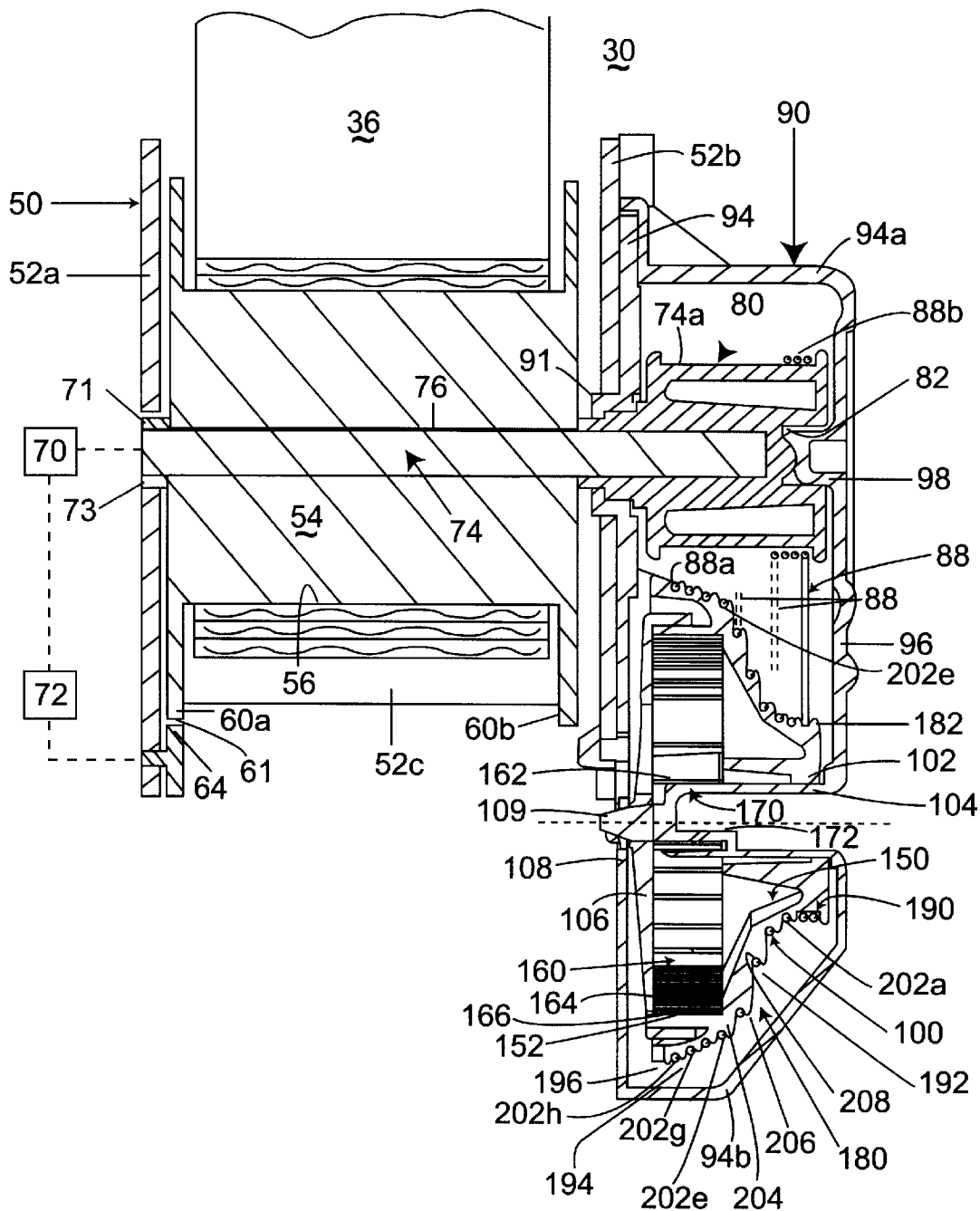
FIG. 2 illustrates a cross sectional view of a seat belt retractor utilizing the present invention.

FIG. 2 illustrates a cross sectional view of the seat belt retractor 30. The retractor 30 comprises a frame 50 having frame sides 52a and 52b, joining a rear frame portion 52c. A spool 54 is rotatably supported between the frame sides 52a and 52b. The spool 54 includes a central portion 56 about which the seat belt 36 is wound. The spool 54 includes a plurality of lock wheels 60a and 60b which are periodically locked by a locking pawl 64 such as during an emergency. The retractor 30 includes a web sensor 70 and a vehicle sensor 72, both of which are known in the art. Typically the web sensor 70 includes an inertial member which rotates outwardly as the spool accelerates linking the spool to a lock wheel, the motion of which causing the locking pawl 64 to engage one or more teeth 61 on the lock wheel 60a and/or 60b. The vehicle sensor 72 typically comprises an inertial mass such as a rolling ball or standing man which similarly causes the lock pawl 64 to move into engagement with the lock wheel 60a and/or 60b. As illustrated, the lock pawl 64 is rotationally supported on one side of the frame 50. This lock pawl 64 may engage one or both of the lock wheels. The lock pawl 64 may be configured as a lock dog, pivoted on both sides of the frame 50 to simultaneously engages both lock wheel 60a and 60b.

A spool shaft 74 extends through the spool 50 and is journaled at 76 thereto. One end 74b of the spool shaft is rotationally supported, by a bearing 71 within an opening 72 in frame side 52b. The other end 74a can be directly supported within an opening in the frame by another bearing as described above or supported indirectly by a bearing 91 formed in a plate 94 of a housing 90 (described below) which supports a cylindrical reel 80 for rotation.

A cylindrical, typically plastic reel, generally shown as 80 is rotationally fixed to end 74a of the shaft 74 so that it rotates with the shaft 70 and spool 54. The reel 80 and other associated mechanisms are enclosed within a housing 90. The housing 90 includes a mounting plate 94 connected with frame side 52b, a top 94a, bottom 94b and an end plate or member 96. The cylinder 80 includes a recess 82 which is rotationally supported by an extending boss 98 formed on member 94a of the housing 90.

Rotationally supported within the housing 90 is a tapered, typically plastic reel 100. The reel 100 includes a first end 102 rotationally supported by a boss 104 (which forms a spring arbor or fixed shaft 170) in housing 90.

The reel 100 includes a stepped bore 150 which extends therethrough. The bore 150 is closed by a spring cap 106 having an opening 108 therein. The large end 152 of the stepped bore provides a housing for a rewind spring 160. The shaft 170 includes a spring attachment part or slot 172 through which is received the inner end 162 of a rewind spring. The outer end 164 of spring 160 is connected generally at location 166 to the walls of the larger diameter portion 152 of the reel 100. An extending end 109 of the shaft 170 extends through the opening 108 in the spring cap 106 to rotationally support the other end of the reel 100 (and spring cap 106). A flexible cable or wire 88 interconnects the cylinder 80 to the tapered reel 100. In the preferred embodiment the cable 88 is a flexible, twisted or breaded stainless steel wire having a diameter of about 0.34 to 0.86 mm.

Figure 3:
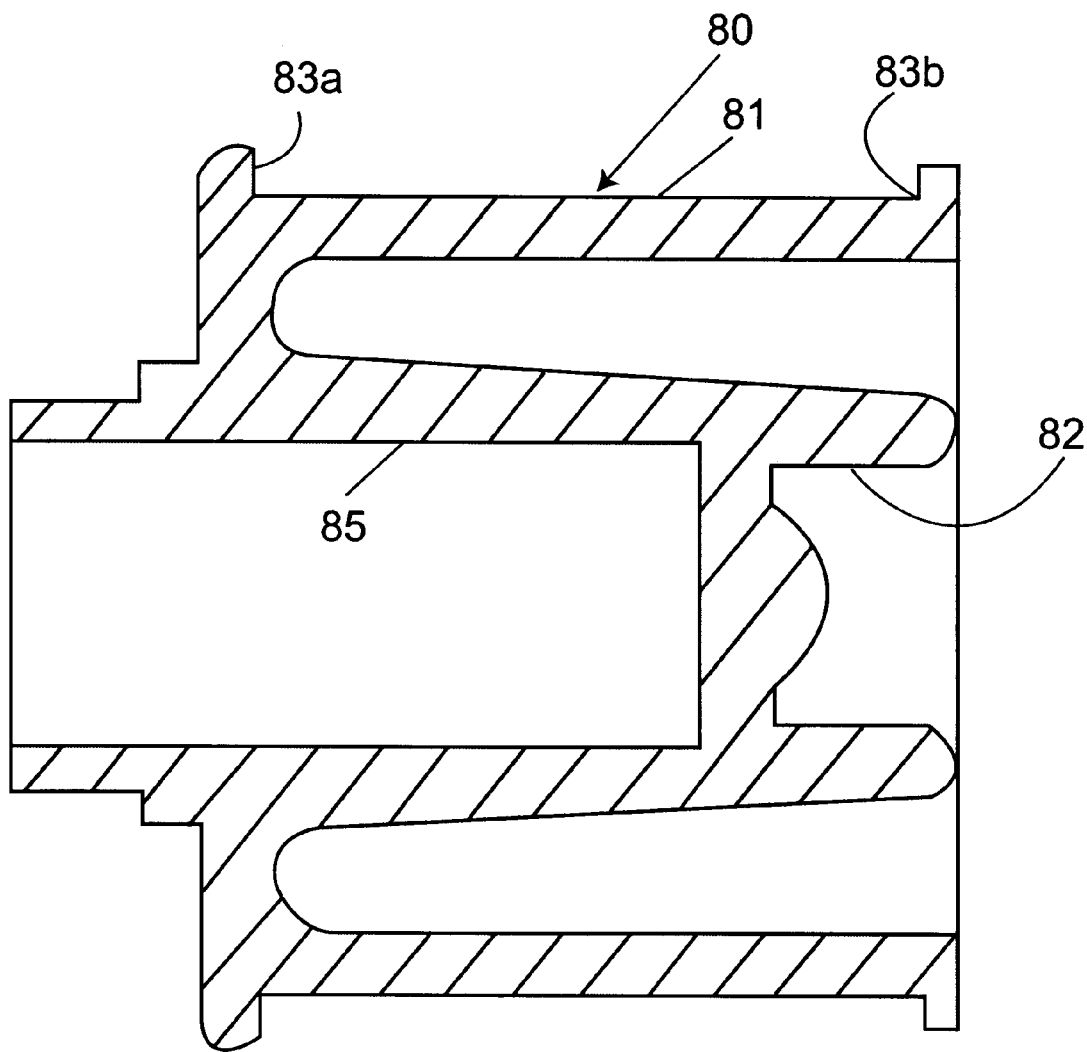
FIG. 3 illustrates a cross sectional view of a cylindrical reel.

Reference is briefly made to FIG. 3 which illustrates the feature of the cylinder 80 in greater detail. As can be seen, the cylinder 80 includes a constant radius center body 81 surrounded by end flanges 83a and 83b. The cable 88 is wound about a portion of the body 81. The shaft 74 is received in the central recess 85 of the reel 80.

Figure 4:
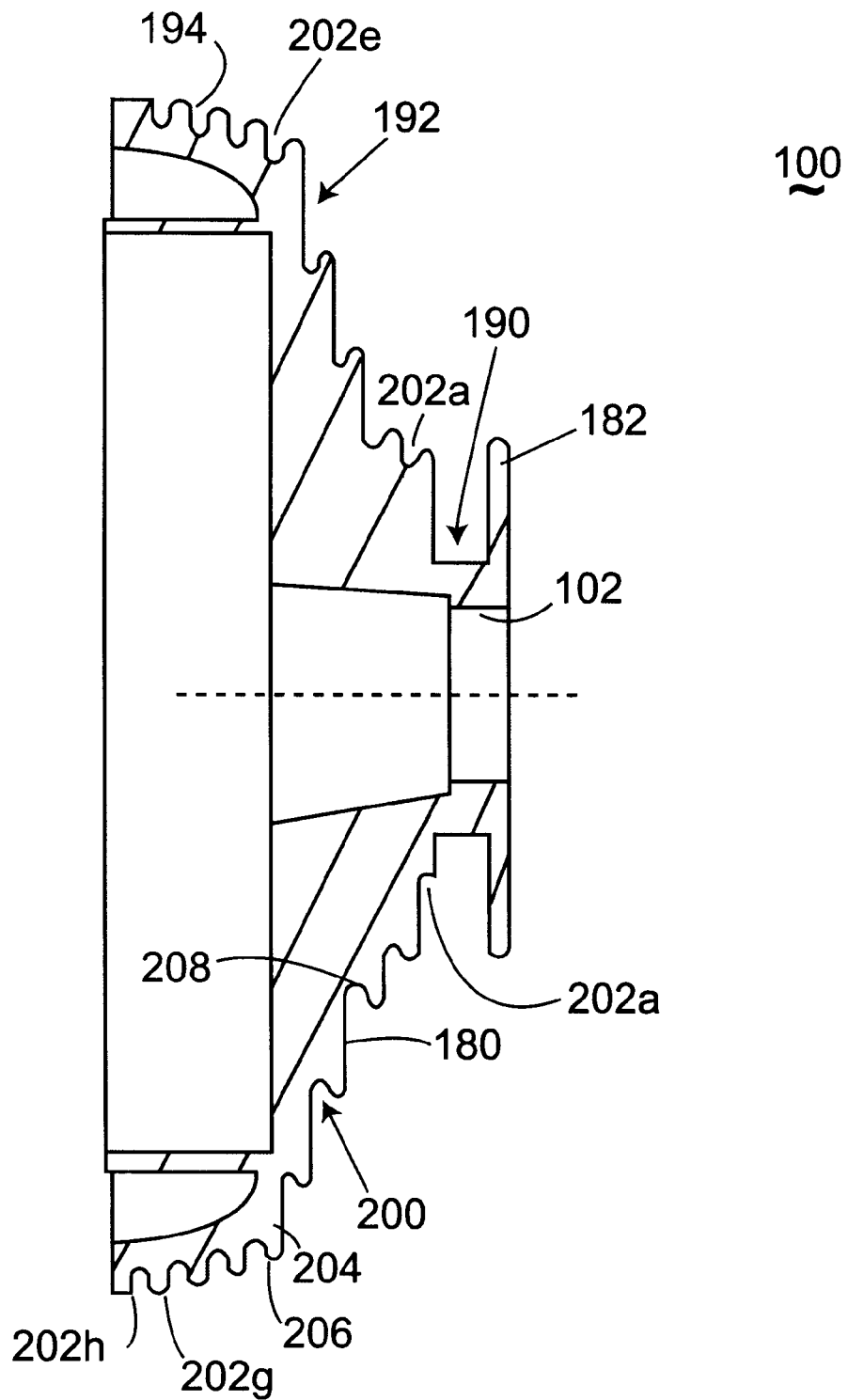
FIG. 4 illustrates a cross sectional view of a tapered reel.
Figure 6:
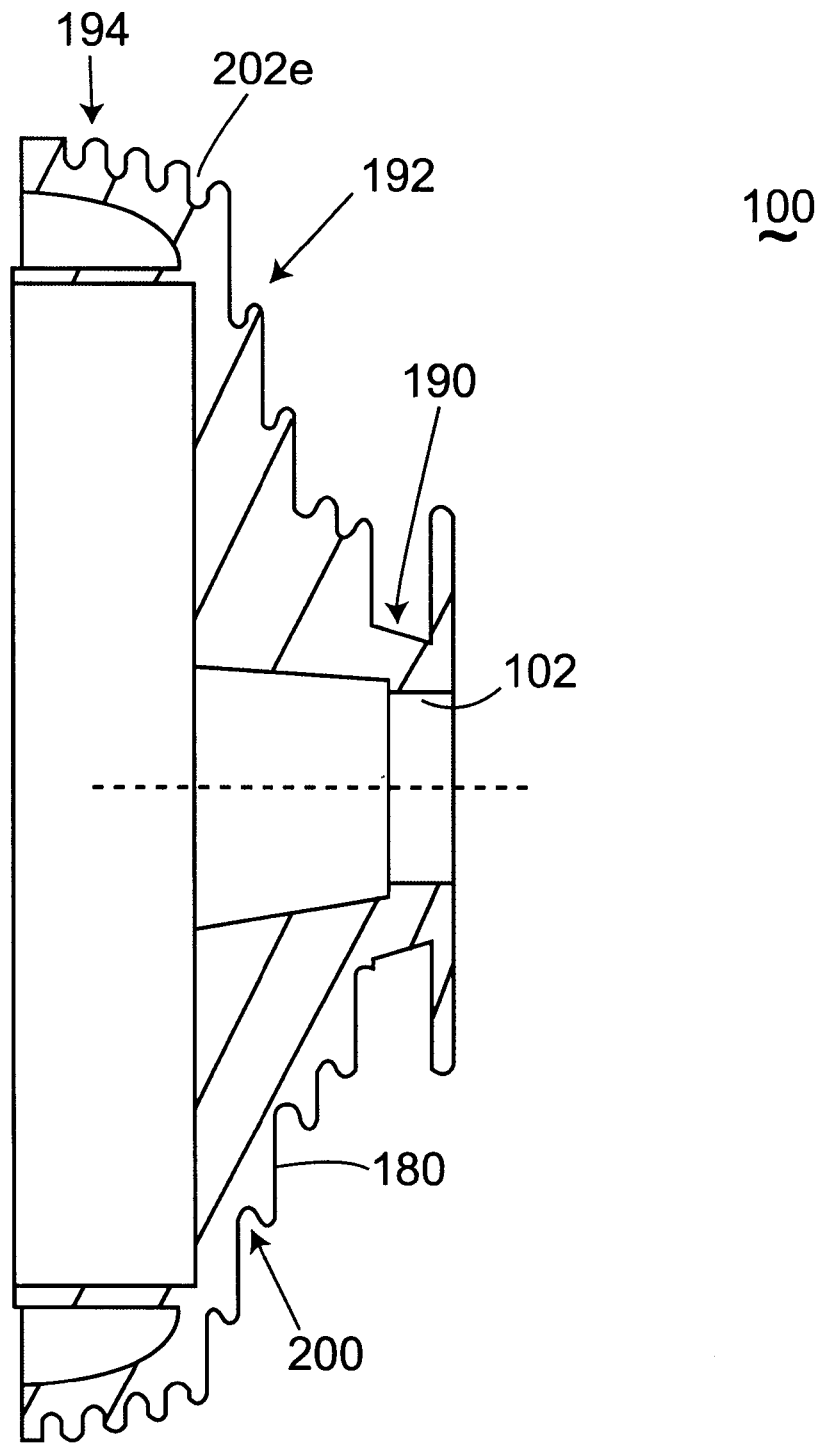
FIG. 6 shows an alternate embodiment of the invention.

FIG. 4 shows the details of the construction of the tapered reel 100. The outer walls or outer peripheral surface 180 of reel 100 has a tapered configuration. This surface 180, interior of a small outer flange 182, includes a first generally flat section 190 adjacent to a second section 192 having a rapidly increasing radius which transitions to a third section 194 having a slope which changes more gradually than the slope of section 192. Sections 192 and 194 preferably include a tapered, spiral groove 200 which begins at the end of section 190 and extends through to the end 196 of section 194. In the embodiment shown in FIG. 6 the first section 192 is conical which aids in the shaping of the torque profile transmitted to the spool during the time that most of the webbing remains rewound upon the spool 54. FIG. 4 shows adjacent groove portions 202a–202h of various segments of the spiral groove 200. Each groove segment is separated by a wall 204 having a circular or radiused contour 206. The inner surface 208 between adjacent groove segments 202a–202n comprises smooth, circular or radiused section contour 208.

Figure 5:
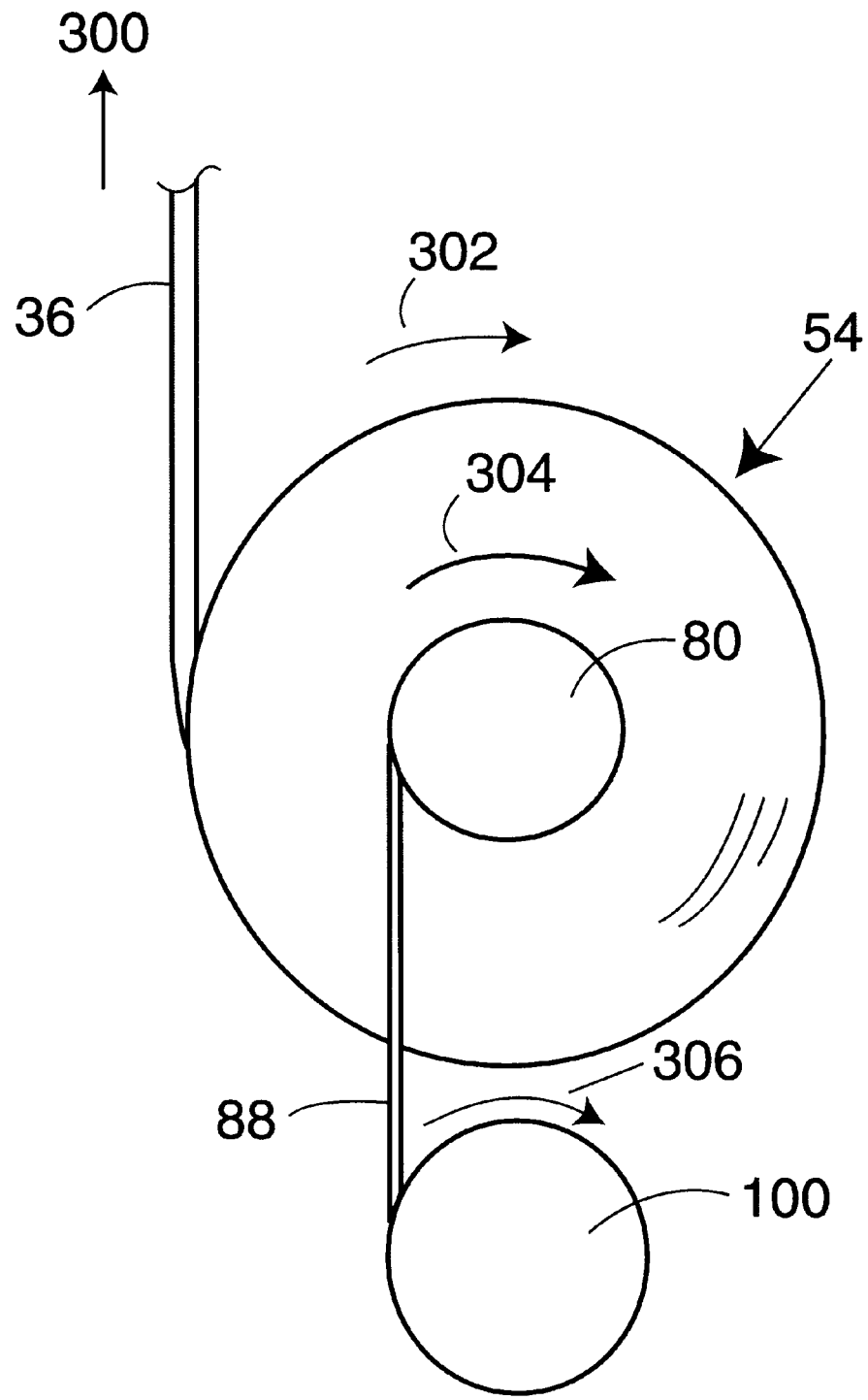
FIG. 5 diagrammatically shows the winding direction of various interrelated components.

As mentioned above, the cable 88 connects the cylinder 80 and tapered reel 100. One end 88a of the cable 88 is secured to reel 100 and is threaded through the spiral groove 200 in a counter-clockwise direction as viewed in FIG. 5. The other end 88b of the cable 88 is secured to and wrapped about the cylindrical reel 80 in a clockwise direction also shown in FIG. 5. In this manner as the seat belt 36 is extended see arrow 300, the spool 54 will rotate in the direction as shown by arrow 302, reel 80 will rotate in the same direction as shown by arrow 304 and reel 100 which also rotate in the same direction shown by arrow 306. The direction of rotation is reversed as the seat belt is retracted.

Reference is again made to FIG. 2 which shows the retractor 30 with its seat belt 36 completely retracted. The retraction of the seat belt 36 is achieved as the force of the rewind spring 160 is communicated to the cable 88 and then to the reel 80, rewinding the spool 54. As can be appreciated, in this condition the cable 88 is maintained tightly wound about the reel 100 and reel 80. The rewind spring 160 continually maintains a determinable amount of tension on the cable 88 to keep it taut. When the seat belt 36 is withdrawn or protracted from spool 54 reel 80, fixedly connected therewith, will rotate with the spool 54. The rotation of the reel 80 is communicated to the cable 88 which in turn causes reel 100 to rotate against the action of the rewind spring 160.

As the webbing 36 is protracted, the cable 88 will unwind from the outer most, narrow diameter groove segments 202h, 202i, etc., of the reel 100 and be displaced upon reel 80. As can be appreciated, as the cable 88 moves from section 190 to section 192 it is supported on groove segments having increasing diameters while being supported at its other end on a constant diameter reel 80. This interrelationship effectively provides for a variable gear ratio between the spring and spool 54 changing the torque transmitted therebetween. As is known in the art, as a typical flat spring is wound tight, as happens in a conventional seat belt retractor, the rewind force applied to the belt increases. This force is applied via the shoulder belt to the shoulder of the seated occupant of course once the seat belt has been secured about the occupant. In some prior systems the amount of force acting on the shoulder has been objectionable to some occupants. In the present invention the cable 88 is design to be repositioned on the reel 100 at a diameter which (in combination with the diameter of reel 80) will reduce the amount of transmitted spring torque seen by the spool and hence by the occupant. The torque at this position (amount of bet protraction) must however, not be reduced to a level in which the rewind spring 106 cannot rewind the extended length of seat belt to its stored, generally vertical position.

In the present embodiments approximately five or six revolutions of cable 88 are wound about section 190, to generate a sufficient transmitted spring force to insure that the seat belt can be completely rewound on the spool (see FIG. 2). As the seat belt is protracted from the spool the cable 88 is displaced into the grooves 202a–202e of section 192 taking about five added revolutions to move the cable 88 to groove segment 202e which is the position corresponding to full seat belt protraction. The added revolutions of the cable 88 about the groove segments in section 194 are provided mainly for the storage of excess cable. These groove segments can optionally be eliminated.

Many changes and modifications in the above described embodiment of the invention can, of course, be carried out without departing from the scope thereof. Accordingly, that scope is intended to be limited only by the scope of the appended claims.

We claim:

1. A seat belt retractor adapted to be secured about a seated occupant comprising:
   a spool (54) having a length of seat belt (36) wound thereon for securement of the occupant, a portion of the seat belt forming a shoulder belt portion, the spool rotationally supported upon a frame (52);
   a tension reducing first means for controlling the amount of spring force transmitted from a rewind spring to the spool and hence the force applied to the shoulder of the occupant via the shoulder belt portion of the seat belt, the first means comprising
   a cylindrical first reel (80), aligned to a rotational axis of the spool, having an ungrooved, smooth body (81) operatively connected to the spool to rotate with the spool;
   a second reel (100) positioned remote from the first reel (80) having a tapered peripheral surface having a continuous spiral groove of varying diameter thereon, the second reel having an axis of rotation parallel to that of the first reel wherein the diameter of the first reel is smaller than the larger diameters of the second reel;
   a rewind spring (160) connected to the second reel for providing a rewind force to rewind the seat, belt upon the spool;
   a flexible link (88) joining the first and second reel and for transmitting the force of the spring to the first reel, the link (88) wound about the second reel within the spiral groove and wound about the first reel (80), wherein the link (88) extends away from the second reel, in a direction generally perpendicular to the axis of rotation of the second reel independent of the position of the link within the groove.

2. The retractor as defined in claim 1 wherein the spiral groove includes a plurality of groove segments (202a–h) separated by a wall (204) wherein the exterior of the wall is arcuately shaped.

3. The retractor as defined in claim 1 wherein the spiral groove includes a plurality of groove segments (202a–h) and wherein the second reel, in between adjacent grooves, is arcuately shaped.

4. The retractor as defined in claim 1 wherein the peripheral surface of the second reel includes, proximate one end thereof, a constant diameter smooth first portion about which the flexible link is also wound, and a second portion of increasing diameter upon which the spiral groove is located.

5. The retractor as defined in claim 1 wherein the peripheral surface of the second reel includes a conical, smooth first portion about which the flexible link is also wound and a second portion of increasing diameter upon which the spiral groove is located.

6. A seat belt retractor adapted to be secured about a seated occupant comprising:
    a spool (54) having a length of seat belt (36) wound thereon for securement of the occupant, a portion of the seat belt forming a shoulder belt portion, the spool rotationally supported upon a frame (52);
    a tension reducing first means for controlling the amount of spring force transmitted from a rewind spring to the spool and hence the force applied to the shoulder of the occupant via the shoulder belt portion of the seat belt, the first means comprising
        a cylindrical first reel (80), aligned to an a rotationally axis of the spool, having an ungrooved, smooth body (81) directly connected to a spool shaft (74) to rotate with the spool;
        a second reel (100) positioned apart from the first reel (80) having a tapered peripheral surface having a continuous spiral groove of varying diameter thereon, the second reel having an axis of rotation parallel to that of the first reel, wherein the diameter of the first reel is smaller than the larger diameters of the second reel;
        a rewind spring (160) operatively connected to the second reel for providing a rewind force to rewind the seat belt upon the spool;
        a flexible link (88) joining the first and second reel and for transmitting the force of the spring to the first reel, the link (88) wound about the second reel within the spiral groove and wound about the first reel (80), wherein the link (88) extends away from the second reel, in a direction generally perpendicular to the axis of rotation of the second reel independent of the position of the link within the groove.

7. A seat belt retractor adapted to be secured about a seated occupant comprising:
    a spool (54) having a length of seat belt (36) wound thereon for securement of the occupant, a portion of the seat belt forming a shoulder belt portion, the spool rotationally supported upon a frame (52);
    a tension reducing first means for controlling the amount of spring force transmitted from a rewind spring to the spool and hence the force applied to the shoulder of the occupant via the shoulder belt portion of the seat belt, the first means comprising
        a cylindrical first spool (80), aligned to a rotational axis of the spool, having an ungrooved, smooth body (81) operatively connected to the spool to rotate with the spool;
        a second reel (100) positioned remote from the first reel (80) having a tapered peripheral surface having a continuous spiral groove of varying diameter thereon, the second reel having an axis of rotation parallel to that of the first reel, wherein the diameter of the first reel is smaller than the larger diameters of the second reel;
        a rewind spring (160) operatively connected to the second reel for providing a rewind force to rewind the seat belt upon the spool;
        a flexible link (88) joining the first and second reel and for transmitting the force of the spring to the first reel, the link (88) wound about the second reel within the spiral groove and wound about the first reel (80).

8. A seat belt retractor adapted to be secured about a seated occupant comprising:
    a spool (54) having a length of seat belt (36) wound thereon for securement of the occupant, a portion of the seat belt forming a shoulder belt portion, the spool rotationally supported upon a frame (52);
    a tension reducing first means for controlling the amount of spring force transmitted from a rewind spring to the spool and hence the force applied to the shoulder of the occupant via the shoulder belt portion of the seat belt, the first means comprising
        a cylindrical first reel (80), aligned to a rotational axis of the spool, having an ungrooved, smooth body (81) operatively connected to the spool to rotate with the spool, the first reel including a longitudinal axis;
        a second reel (100) positioned remote from the first reel (80) having a tapered peripheral surface having a continuous spiral groove of varying diameter thereon, the second reel having an axis of rotation parallel to that of the first reel, wherein the diameter of the first reel is smaller than the larger diameters of the second reel;
        a rewind spring (160) operatively connected to the second reel for providing a rewind force to rewind the seat belt upon the spool;
        a flexible link (88) joining the first and second reel and for transmitting the force of the spring to the first reel, the link (88) wound about the second reel within the spiral groove and wound about the first reel (80), wherein the link (88) extends away from the first reel, in a direction generally parallel to a plane which is perpendicular to the longitudinal axis independent of the position of the link within the groove.

9. A seat belt retractor adapted to be secured about a seated occupant comprising:
    a spool (54) having a length of seat belt (36) wound thereon for securement of the occupant, a portion of the seat belt forming a shoulder belt portion, the spool rotationally supported upon a frame (52);
    a tension reducing first means for controlling the amount of spring force transmitted from a rewind spring to the spool and hence the force applied to the shoulder of the occupant via the shoulder belt portion of the seat belt, the first means comprising
        a cylindrical first reel (80), aligned to a rotational axis of the spool, having an ungrooved, smooth body (81) operatively connected to the spool to rotate with the spool;
        a second reel (100) positioned remote from the first reel (80) having a tapered peripheral surface having a continuous spiral groove of varying diameter thereon, the second reel having an axis of rotation parallel to that of the first reel;

a rewind spring (160) operatively connected to the second reel for providing a rewind force to rewind the seat belt upon the spool;

a flexible link (88) joining the first and second reel and for transmitting the force of the spring to the first reel, the link (88) wound about the second reel within the spiral groove and wound about the first reel (80);

wherein the peripheral surface of the second reel includes, proximate one end thereof, a constant diameter smooth first portion about which the flexible link is also wound, and a second portion of increasing diameter upon which the spiral groove is located.

10. A seat belt retractor adapted to be secured about a seated occupant comprising:

a spool (54) having a length of seat belt (36) wound thereon for securement of the occupant, a portion of the seat belt forming a shoulder belt portion, the spool rotationally supported upon a frame (52);

a tension reducing first means for controlling the amount of spring force transmitted from a rewind spring to the spool and hence the force applied to the shoulder of the occupant via the shoulder belt portion of the seat belt, the first means comprising a cylindrical first reel (80), aligned to a rotational axis of the spool, having an ungrooved, smooth body (81) operatively connected to the spool to rotate with the spool;

a second reel (100) positioned remote from the first reel (80) having a tapered peripheral surface having a continuous spiral groove of varying diameter thereon, the second reel having an axis of rotation parallel to that of the first reel;

a rewind spring (160) operatively connected to the second reel for providing a rewind force to rewind the seat belt upon the spool;

a flexible link (88) joining the first and second reel and for transmitting the force of the spring to the first reel, the link (88) wound about the second reel within the spiral groove and wound about the first reel (80);

wherein the peripheral surface of the second reel includes a conical, smooth first portion about which the flexible link is also wound and a second portion of increasing diameter upon which the spiral groove is located.

* * * * *